United States Patent [19]

Sheppard

[11] 4,233,277
[45] Nov. 11, 1980

[54] PREPARING REFRACTORY METAL BORIDE POWDER

[75] Inventor: Robert S. Sheppard, Doylestown, Ohio

[73] Assignee: PPG Industries, Inc., Pittsburgh, Pa.

[21] Appl. No.: 546,837

[22] Filed: Feb. 3, 1975

[51] Int. Cl.$^2$ .................................................. C01B 35/04
[52] U.S. Cl. ................................................................ 423/297
[58] Field of Search .......................... 423/297, 291, 440; 204/164

[56] References Cited

U.S. PATENT DOCUMENTS

| | | | |
|---|---|---|---|
| 2,768,061 | 10/1956 | Cook et al. | 204/164 X |
| 3,253,886 | 5/1966 | Lamprey et al. | 423/297 |
| 3,340,020 | 9/1967 | Neuenschwander | 423/291 |
| 3,455,745 | 7/1969 | Kern | 148/6.3 |
| 3,661,523 | 5/1972 | Sheppard et al. | 423/440 |
| 3,812,239 | 5/1974 | Swaney | 423/440 |
| 3,979,500 | 9/1976 | Sheppard et al. | 423/297 |

FOREIGN PATENT DOCUMENTS

| | | | |
|---|---|---|---|
| 1533423 | 9/1968 | France | 423/289 |
| 1194415 | 6/1970 | United Kingdom | 423/289 |

*Primary Examiner*—Brian E. Hearn
*Attorney, Agent, or Firm*—Irwin M. Stein

[57] ABSTRACT

The preparation of refractory metal borides of Group 4b of the Periodic Table of the Elements by reaction in the vapor phase of the corresponding metal halide, e.g., metal chloride, with a boron source reactant in the presence of hydrogen in a reactor is described. Reactants are introduced into a reactant mixing zone containing hydrogen through reactant inlet assembly means. Refractory metal boride product deposits on the exposed surfaces of the reactant inlet assembly means are reduced significantly by introducing metal halide reactant and substantially anhydrous hydrogen halide into the hydrogen stream upstream of the boron source reactant while introducing boron source reactant mixed with inert carrier gas, e.g., argon, into said hydrogen stream downstream of the metal halide and hydrogen halide streams.

17 Claims, 1 Drawing Figure

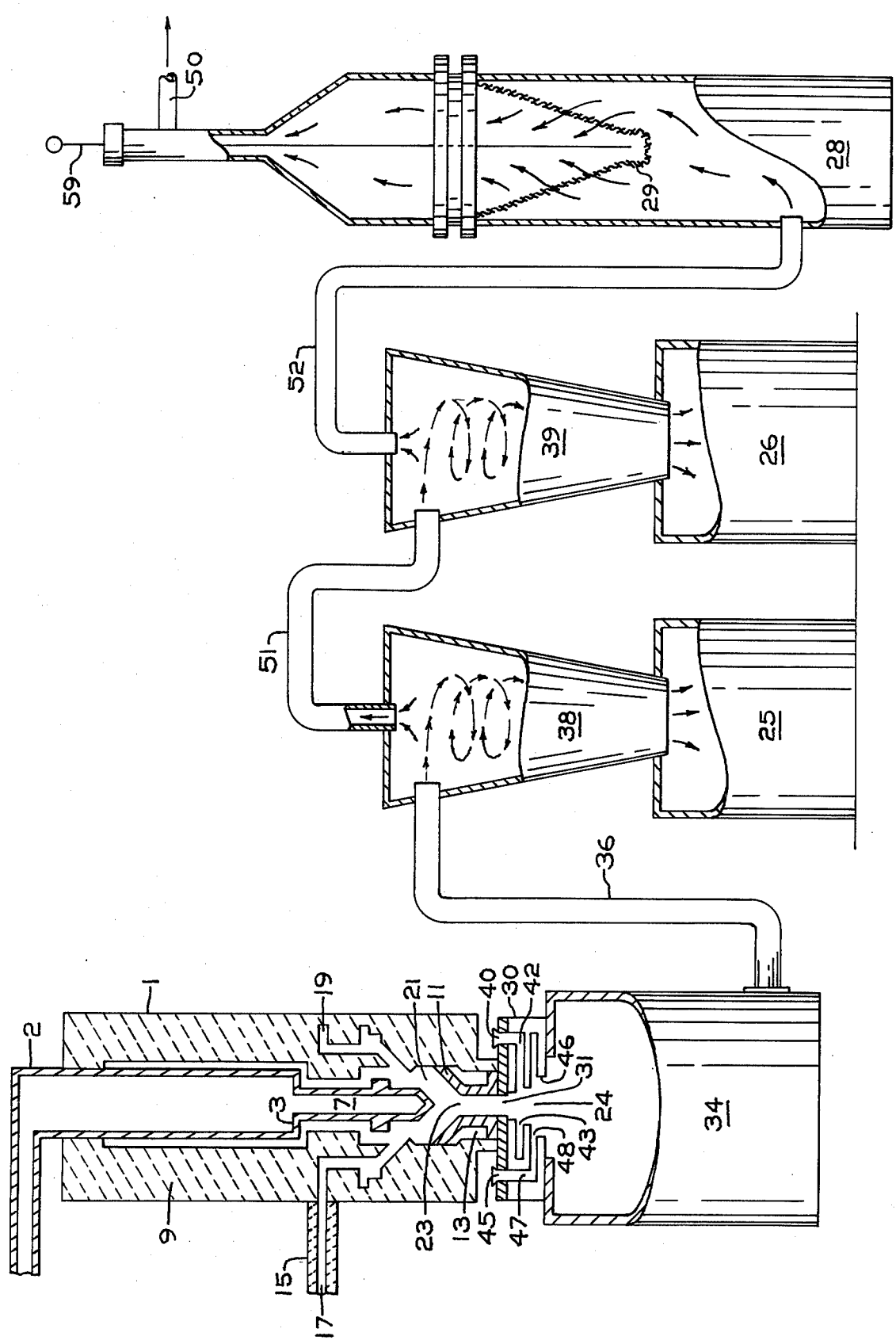

PREPARING REFRACTORY METAL BORIDE POWDER

DESCRIPTION OF THE INVENTION

The preparation of the borides of titanium, zirconium, and hafnium metals by vapor phase reaction of the corresponding metal halide, e.g., titanium tetrachloride, and boron source, e.g., boron halide, reactants, in the presence of hydrogen at temperatures of from 1000°–1330° C., 1700°–2500° C., and 1900°–2700° C., respectively, has been reported in Refractory Hard Metals, by Schwarzkopf and Kieffer, The MacMillan Company, N.Y., 1953, at pages 277, 281, and 285. Typically, these vapor phase reactions have been conducted by heating the reactants in the presence of an incandescent tungsten filament. Such procedures, however, produce a coating of the metal boride on a heated substrate rather than a powdery product. The aforementioned vapor phase reaction for preparing titanium diboride has been conducted at temperatures less than 1200° C. using sodium vapor in lieu of hydrogen (U.S. Pat. No. 3,244,482).

Finely-divided, e.g., submicron, refractory metal boride powder, e.g., titanium diboride, zirconium diboride and hafnium diboride, can be prepared by conducting the vapor phase reaction in the absence of a substrate and thereby form a solid powder directly from the gas phase. In one such method hydrogen is heated, e.g., by plasma heating means to form a highly heated hydrogen gas stream, which is introduced into the reactor. The reactants, i.e., the corresponding metal halide, e.g., titanium halide, and boron source, e.g., boron hydride or boron halide, are introduced into the reactor and preferably into the hot hydrogen stream. The reactants mix with the hydrogen and react in a reaction zone that is at metal boride forming temperatures. The solid metal boride formed is removed from the reactor suspended in the gaseous product stream, quenched, and recovered in conventional fine particle collection equipment, e.g. cyclones, electrostatic percipitators, dust collectors, etc. The above-described method can be used to prepare submicron metal boride powder in which the preponderant number of metal boride particles comprising the powder product have a particle size in the range of between 0.05 and 0.7 microns.

In order to produce finely-divided, e.g., submicron, metal boride powder having a relatively narrow particle size distribution, it is necessary to bring the reactants together quickly within the reactor at reaction temperatures most conducive for the formation of the metal boride. This procedure permits a major percentage of the reaction to occur at substantially the same conditions, thereby achieving a substantially uniform product. In order to bring the reactants together quickly at reaction temperatures, the reactants are introduced into a reactant mixing zone through reactant inlet assembly means. The hot hydrogen stream is typically within or adjacent to the reactant mixing zone and consequently in close proximity to the reactant inlet assembly means. The heat content of the hot hydrogen stream and the reactant streams are sufficient to establish the temperature at which metal boride formation occurs. Consequently, once the reactants are introduced into the reactant mixing zone in the presence of hot hydrogen stream, reaction occurs immediately. Since the reactant inlet assembly borders on the reactant mixing zone and the reaction zone, which are almost indistinguishable, there is a strong tendency for the solid metal boride product produced by the reaction to deposit upon the surfaces of the aforesaid assembly that are exposed to the reactant mixing zone and the reaction zone. These deposits accumulate and grow on the aforesaid surfaces and can eventually partially or even completely block the inlet ports in the assembly through which the reactants flow into the reactor. Partial blockage of the inlet ports can cause a deviation from the desired reactant stream directional flow and consequently can cause an increase in the rate at which metal boride product deposits on the inlet assembly means.

It has now been discovered, that in the process for preparing refractory metal boride powder by gas phase reaction of the corresponding metal halide and boron source in the presence of hydrogen, particular techniques for reactant introduction are useful to insure substantially deposit free operation at the point of reactant introduction, i.e., on the reactant inlet assembly means. In particular, it has been found that substantially anhydrous hydrogen halide should be introduced into the reaction zone and that it and the metal halide reactant should be introduced into the reactant mixing zone upstream of the boron source reactant. Further, it has been found that the carrier gas utilized for the introduction of the boron source reactant into the reactant mixing zone should be an inert gas, e.g., a noble gas such as argon. When the boron source reactant is boron halide, the carrier gas should also be substantially free of elemental hydrogen. By following the aforesaid process techniques, refractory metal boride deposits on the reactant inlet assembly can be substantially eliminated and thereby provide continuity of operation.

BRIEF DESCRIPTION OF THE DRAWING

The improved process for preparing refractory metal boride powder described herein can be better understood by reference to the accompanying drawing which is a diagram of an assemblage, partially broken away in section, comprising arc plasma gas heating means, two-slot reactant inlet assembly means for introducing reactants to the hot gas stream emanating from the plasma heater, reactor means, and auxiliary product recovery equipment means (cyclones and bag filter) for recovering the metal boride powder product suspended in the reactor product gas effluent.

DETAILED DESCRIPTION

Refractory metal borides of Group 4b of the Periodic Table of the Elements (Handbook of Chemistry and Physics, 45th edition, The Chemical Rubber Co. 1964), such as titanium diboride, zirconium diboride and hafnium diboride are useful as metallurgical additives, as cermet components, for dispersion strengthening of metals, as components of the so-called superalloys and nuclear steels, as coatings for materials exposed to molten metals as current conducting elements when consolidated into solid shapes and in refractory applications. Many of such applications require a powdered product.

The aforementioned refractory metal borides can be prepared in powder form by reacting the halides of Group 4b metals and boron source reactant in the vapor phase in the presence of hydrogen and in the absence of a substrate, thereby forming the solid metal boride directly from the gas phase.

In order to achieve a relatively narrow particle size distribution for the boride product, the metal halide and boron source reactants should be heated to and reacted at the desired metal boride forming temperature in a relatively short time interval. Preferably, the reaction is conducted out of contact with the exposed surfaces of the reactant inlet assembly and the reactor. Residence times in the reactor at reaction temperatures are in the range of milliseconds as distinguished from seconds or minutes.

One possible method for conducting the above-described vapor phase reaction is to heat both reactants to reaction temperature before mixing them in the reactor. However, there are numerous problems connected with heating corrosive gases like the metal halide, e.g., titanium tetrachloride, to metal boride forming temperatures and with handling such highly heated reactant gases. In another method, both reactants are introduced (separately or premixed) at substantially below reaction temperatures into a high temperature reactant mixing and reaction zone. However, unless the reactants are brought instantaneously to reaction temperatures, the vapor phase reaction occurs over a fairly broad temperature range and produces a product that does not have a relatively narrow particle size distribution. In order to achieve substantially instantaneous complete reaction, it is necessary to introduce quickly the reactants into the principal reaction zone, i.e., the zone where most, usually greater than 80 percent of the reaction occurs. Consequently, the principal reaction zone is usually in close proximity to the zone in which the reactants are introduced. This technique can result in product growth on the surfaces of the reactant inlet assembly exposed to the reaction, especially the reactant inlet means.

It has now been discovered that the aforementioned objectionable product deposits can be substantially eliminated by following a prescribed reactant introduction sequence and by the use of certain auxiliary and carrier gases. In particular, it has been found that the metal halide reactant, e.g., titanium halide, should be introduced into the principal reactant mixing zone, i.e., the zone wherein the reactants are mixed and/or first exposed to metal boride reaction temperatures upstream or above the zone in which the boron source reactant is introduced into the principal reactant mixing zone. Further, substantially anhydrous hydrogen halide is introduced simultaneously into the principal reactant mixing zone upstream of the boron source reactant. In addition, an inert carrier gas e.g., a hydrogen free inert gas, is used to assist the introduction of the boron source reactant. By the aforementioned techniques and process steps, metal boride product deposits and growth on the exposed surfaces of the reactant inlet assembly and particularly the reactant inlet ports of such assembly is substantially eliminated or significantly decreased to the extent that continuous operation of the process is possible. The substantial elimination of such objectionable metal boride product growth on the exposed surfaces of the reactant inlet ports and assembly is extremely important for commercial processes where continuous operation is an economic necessity.

As indicated, anhydrous hydrogen halide is introduced into the principal reactant mixing zone to assist in retarding or preventing deposits of the boride product and the growth of such deposits on surfaces of the reactant inlet assembly adjacent the reactant mixing zone and reaction zone. In recirculating reactors, as distinguished from plug flow type reactors, mixing of reactants occurs to some extent throughout the reactor because of the conventional use of an excess of one reactant and the recirculation of gas within the reactor. There is, however, a zone wherein the reactants are first exposed jointly to reaction temperatures. This can be accomplished by premixing the reactants at a temperature at which they do not react and mixing them with a heat source, e.g., a hot hydrogen plasma, to bring immediately the reactants to reaction temperature. The heat source, can of course, be derived from any source, e.g., a further chemical reaction, the heat of reaction from an initial reaction or an external heat source. Alternatively, the reactants can be introduced separately into the reactor, and mixed and exposed therein together to reaction temperatures. Any conventional method can be used. Regardless of the particular method used, a zone in the reactor is established wherein the reactants, usually substantially all of the reactants, are first exposed jointly to reaction temperatures. This zone is the principal reactant mixing zone and usually just precedes the beginning of the reaction zone. If, the reactants are introduced into the reactor and mixed at more than one location, e.g., serially, at reaction temperatures, then a series of principal mixing zones would exist and the method described herein can be practiced at each of such mixing zones.

The hydrogen halide introduced into the principal reactant mixing zone is substantially anhydrous since the presence of water in the reactor would cause corrosion problems within the reactor and downstream equipment. The hydrogen halide is preferably in the gaseous state; however, liquid hydrogen halide could be used since the heat of the reaction would vaporize the hydrogen halide easily. The hydrogen halide used can be selected from the group consisting of hydrogen chloride, hydrogen bromide, hydrogen fluoride and hydrogen iodide. Hydrogen chloride is economically preferred. The halide portion of the hydrogen halide is preferably the same as the halide portion of the gaseous metal or metalloid halide reactants in order to avoid the introduction into the system of different halogen gaseous species which would require complex and expensive recovery and separation equipment for the separation and recovery of the various components of the reactor effluent product stream.

The amount of hydrogen halide introduced into the mixing zone is that amount which is sufficient to retard the growth of metal boride product on the exposed surfaces of the reactor and/or the reactant inlet nozzle assembly, i.e., a retarding or inhibiting amount. For purposes of this description the term "exposed surfaces of the reactor" is intended to mean and include those exposed surfaces of the reactor and the reactant inlet nozzle assembly and any other similar surfaces that are adjacent the zone of reactant introduction, i.e., the zone wherein reactant(s) are introduced into the reactor and on which metal boride deposits occur. The amount of anhydrous hydrogen halide used can vary; but typically will range between about 50 and about 350 mole percent hydrogen halide based on the Group 4b metal halide reactant. This amount of anhydrous hydrogen halide is added to the reactor and is to be distinguished from hydrogen halide formed in the reactor as a result of the reaction, i.e., that formed by the combination of hydrogen and halogen within the reactor.

The particular manner, as distinguished from the location, in which the anhydrous hydrogen halide is introduced into the principal reactant mixing zone is not critical to the present invention provided that it is introduced upstream of the boron source reactant. Thus, the hydrogen halide can be introduced with the metal halide reactant or as a separate gas stream. When introduced with the metal halide reactant, it can be as part of or as a total replacement for the carrier gas, e.g., hydrogen, that can be used with the metal halide reactant. Alternatively, the hydrogen halide can be introduced as a shroud between the metal halide and boron source reactants or even above (upstream) the metal halide reactant. Preferably, the anhydrous hydrogen halide is introduced with the metal halide reactant. Thus, the hydrogen halide is introduced with the metal halide reactant or as a separate stream directly into the principal reactant mixing zone but above the zone in which the boron source reactant is introduced.

An important feature of the present invention is the placement of a sufficient amount of hydrogen halide to retard product growth on the reactant inlet ports into the mixing zone, i.e., the zone where the reactants first experience jointly temperatures at which a reaction between the reactants can occur. Thus, if the hydrogen halide is introduced indiscriminately into the reactor, the desired effect (avoidance of product growth) may not be accomplished. Since the mixing and reaction zones are substantially indiscernible to the human eye in certain methods of reaction introduction because of the short residence times involved, it is important to use a method for introducing hydrogen halide which insures its presence in the principal reactant mixing zone. This can be accomplished, as indicated above, by introducing the hydrogen halide with the metal halide reactant, e.g., as a carrier gas, or by establishing a stream of hydrogen halide in the mixing zone prior to commencement of the introduction of the reactants, or any other equivalent method.

In addition to the above-described practice, the carrier gas used to assist the introduction of the boron source reactant is an inert gas. By "inert", is meant that the carrier gas is substantially chemically inert to the boron source reactant and does not adversely affect chemically the reactions that occur within the reactor. It has been found that if hydrogen, which is normally used as the carrier gas in the system described, is used within boron halide, such as boron trichloride, a reaction occurs, which results in obstruction of the conduit and inlet port used for introduction of the boron source reactant. Thus, hydrogen is not considered "inert" for use as a carrier gas for boron halide reactant. Consequently, it has been found necessary to utilize an inert gas such as the noble gases namely, helium, neon, argon, etc., as the carrier gas. Preferably argon is used as the carrier gas. The amount of carrier gas used to facilitate the introduction of the reactants is not critical and will vary depending on the amount of reactant introduced into the reactor as well as size limitations of the conduit utilized for introduction thereof. Typically, the amount of carrier gas used will range between 250 and 1200 mole percent based on the reactant with which the carrier gas is admixed.

Generally, any volatile inorganic titanium, zirconium or hafnium halide, e.g., a compound of only the aforementioned metal and halogen (chlorine, bromine, fluorine and iodine), can be used as the source of the aforementioned metal in the refractory metal boride powder product prepared by the process described herein. As used herein the terms "metal halide" and "metal boride" or "metal diboride" are intended to mean and include the halides and borides respectively of titanium, zirconium and hafnium, i.e., the elements of Group 4b of the aforesaid Periodic Table of the Elements. However, for the sake of convenience and brevity, reference will be made sometimes to only one of the aforementioned metal halides or borides.

Exemplary of the refractory metal halides that can be employed in the present process include: titanium tetrachloride, titanium tetrabromide, titanium tetraiodide, titanium tetrafluoride, zirconium tetrabromide, zirconium tetrachloride, zirconium tetrafluoride, zirconium tetraiodide, hafnium tetrabromide, hafnium tetrachloride, hafnium tetrafluoride, hafnium tetraiodide, as well as subhalides of titanium and zirconium such as titanium dichloride, titanium trichloride, titanium trifluoride, zirconium dibromide, zirconium tribromide, zirconium dichloride and zirconium trichloride. Of cource, subhalides other than the subchlorides and subfluorides can be used in the same manner. Mixtures of metal halides of the same metal such as the chlorides and the bromides, e.g., titanium tetrachloride and titanium tetrabromide can be employed as the metal halide reactant. Further, mixtures of halides of different metals can be used when it is desired to co-produce more than one metal boride powder, e.g., titanium diboride and zirconium diboride. Preferably, the halogen portion of the metal halide reactant(s) is the same to avoid separation and recovery of different hydrogen halides from the product stream. The metal halide reactant(s) can be introduced into the reactant inlet assembly (mixer means) used to introduce the reactants into the reactor as a liquid or vapor; but, should be introduced in such a manner that the reactant(s) is a vapor in the reactant mixing zone and subsequent reaction zone. Economically preferred as the metal halide reactant are the tetrachlorides, e.g., titanium tetrachloride. The metal halide reactant(s) should be substantially pure, i.e., substantially free of metal contaminants and free of chemically combined oxygen so as to produce a substantially pure metal boride powder.

The boron source reactant like the metal halide reactant should be also oxygen-free and substantially pure to avoid the introduction of oxygen and metal contaminants into the metal diboride product. By oxygen-free is meant that the boron source is substantially free of chemically combined oxygen, e.g., the oxides of boron, as well as uncombined oxygen. As a suitable source of boron for the metal borides, there can be mentioned inorganic boron compounds such as boron tribromide, boron triiodide, boron trichloride, boron trifluoride and the hydroborides (boranes), e.g., $B_2H_6$, $B_5H_9$, $B_{10}H_{14}$, and $B_6H_2$. Boron trichloride is preferred. As in the case of the metal halide reactant, the boron source reactant is introduced into the reactor in such a manner that it is present in the reactant mixing zone and reaction zone as a vapor. The metal halide source and boron source should be chosen from those compounds which, in combination, provide a thermodynamically favorable reaction at the desired reaction temperature. For example, the reaction of titanium tetrachloride with boron trifluoride is thermodynamically less favorable at 2000° K. than at 2500° K. Thus, such thermodynamically less favorable reactions will require higher reaction temperatures.

The amount of boron source reactant introduced into the reaction zone in the reactor will be preferably in at least stoichiometric quantities, i.e., in amounts sufficient to provide at least two atoms of boron for each atom of metal, e.g., titanium, introduced into the reaction zone in the reactor as metal halide, e.g, titanium halide, reactant. The ratio of the boron source reactant to the metal halide reactant can, of course, vary from stoichiometric quantities. Thus, the boron source reactant can be introduced in amounts sufficient to provide in the reaction zone between about 1.8 and about 3 atoms of boron per atom of metal, e.g., titanium. Preferably, greater than the stoichiometric ratio is used. For example, the mole ratio of reactants boron trihalide to titanium tetrahalide ($BX_3/TiX_4$), wherein X is halogen, can vary from about 1.8:1 to 3:1 and preferably is about 2. When a stoichiometric excess of the boron source is used, less residual unreacted metal halide reactant is found in the product. When a stoichiometric excess of metal halide is used, sub-halides of the metal are found in the product. While it is preferred that the boron source reactant be used in stoichiometric excess either of the metal halide or boron source reactants can be used in stoichiometric excess in amounts of from 5 to 30 percent by weight.

A carbon-containing metal diboride powder can be produced in the reactor by introducing a carbon source reactant into the reaction zone in the reactor. Such carbon source reactant is of the type that is volatile in the reaction zone and is capable of reacting in a thermodynamically favorable manner at the temperatures at which the reaction is conducted. In the aforesaid embodiment, volatile hydrocarbons, halogenated hydrocarbons or mixtures thereof that are substantially pure and oxygen-free, as defined above, can be used as the carbon source. As used herein, the term "halogenated hydrocarbon", e.g., "chlorinated hydrocarbon", is intended to mean and include both compounds of carbon, halogen and hydrogen, and compounds only of carbon and halogen, e.g., carbon tetrachloride.

Typical hydrocarbons that can be used as the carbon source include the normally gaseous or liquid but relatively volatile hydrocarbons including saturated and unsaturated $C_1$-$C_{12}$ hydrocarbons, such as methane, ethane, propane, the butanes, the pentanes, decanes, dodecanes, ethylene, propylene, the butylenes and amylenes, symmetrical dimethylethylene and like alkenes, cycloaliphatic and aromatic hydrocarbons, such as cyclopentane, cyclohexane, toluene, benzene, etc., and acetylenic compounds of which may be noted acetylene, methyl acetylene, ethyl acetylene, and dimethyl acetylene. Methane or propane are economically preferred for this purpose. Rarely are hydrocarbons of more than twelve carbons used.

Examples of halogenated hydrocarbons that can be used as the source of carbon in the process described herein include saturated and unsaturated compounds containing from one to twelve, more usually one to eight, carbon atoms, such as methyl chloride, ethyl chloride, chloroform, methylene chloride, carbon tetrachloride, dichlorodifluoromethane, amyl chloride, chloroethane, vinyl chloride, 1,1-dichloroethylene, 1,2-dichloroethylene, 1,1-dichloroethane, 1,2-dichloroethane, ethylene dibromide, trichloroethylene, perchloroethylene, propylene dichloride, 1,1,2-trichloroethane, 1,1,1-trichloroethane, 1,1,1,2- and 1,1,2,2-tetrachloroethane, hexachloroethane, and like aliphatic chlorides, fluorides, bromides or iodides containing up to about twelve carbon atoms, most preferably up to about six carbon atoms. Aromatic halocarbon compounds, e.g., chlorocarbon compounds, also can be used. Such compounds include $C_6$-$C_9$ halogenated aromatic compounds, such as monochlorobenzene, orthodichlorobenzene, paradichlorobenzene and the like. Cycloaliphatic halides, such as the $C_5$-$C_6$ aliphatic halides, e.g., chlorinated cyclopentane and cyclohexane, etc., can also be used.

Typically, the above-described hydrocarbons and halogenated hydrocarbons should be readily vaporizable (volatile) without tar formation since otherwise unnecessary difficulties which are unrelated to the process itself can arise, such as the plugging of transfer lines by decomposition or polymerization products produced in the course of vaporizing the carbon source reactant.

The vapor phase reaction of metal halide and boron source reactants with or without a volatile carbon source is conducted in the presence of hydrogen. The amount of hydrogen utilized in the above-described process is at least that amount which is required stoichiometrically to satisfy the theoretical demand of the reaction. Preferably, the amount of hydrogen used is in excess of the theoretical amount. When, for example, the metal halide reactant used is titanium tetrachloride and the boron source reactant used is boron trichloride, the theoretical amount or demand of hydrogen required can be expressed by the equation:

$$TiCl_4 + 2BCl_3 + 5H_2 \rightarrow TiB_2 + 10\ HCl \qquad (1)$$

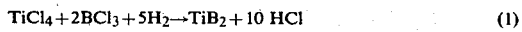

Often the amount of hydrogen utilized will be in excess of ten times and as high as 100 times the amount of hydrogen shown to be required by the above equation or required to equal the chemical equivalents of halogen of the metal halide and/or boron halide reactants. When the boron source is a hydroboride, the hydrogen available from the hydroboride can be used to satisfy all or a part of the hydrogen demand. Typically, the mole ratio of hydrogen to metal halide reactant ranges between about 20 and 40, e.g., 25 moles of hydrogen per mole of metal halide.

The temperature at which the vapor phase reaction of metal halide and boron source reactants is conducted will depend on the reactants selected and will be those temperatures at which submicron metal boride powder is produced with the selected reactants under thermodynamically favorable conditions, i.e., metal boride powder forming temperatures. The average reaction zone temperature for the aforementioned vapor phase production of metal boride powder such as titanium diboride powder typically is above 1000° C. and usually ranges upwardly of 1000° C. to about 3500° C. The process can be conducted at subatmospheric, atmospheric, and superatmospheric pressures. Typically, the process is conducted at between about 1 and about 3 atmospheres, normally between 1 and 1.5 atmospheres pressure.

The process and handling equipment utilized in the aforementioned process for producing metal diboride powder (as more specifically described hereinafter) are constructed from materials resistant to the temperatures and corrosive environment to which they are exposed during the various steps of the procedure, as outlined hereinafter. The present invention will be more fully understood by reference to the accompanying drawing. Referring now to the FIGURE, there is shown apparatus comprising plasma generator heating means 1 mounted atop reactant inlet assembly (mixer) means 30 which, in turn, is mounted atop reactor 34. Although the aforesaid apparatus is shown in vertical alignment, other alignments away from the vertical including a horizontal alignment are contemplated. While the plasma generator heating means shown is an arc heater, other plasma heater types, e.g., an induction (high frequency) heater, can also be used. Further, other heating means such as electrical resistance heaters, can be used to heat hydrogen to the temperatures required by the process described herein. The hydrogen is heated typically to temperatures which are sufficient to establish and maintain metal boride forming temperatures in the reaction zone bearing in mind that it is mixed with the metal halide and boron source reactants which are introduced into the reaction zone at below the reaction temperature, usually significantly below reaction temperature. Thus, the principal source of heat for the reaction is generally the highly heated hydrogen gas stream. Plasma heater 1 consists essentially of an annular anode 11 which is aligned coaxially with cathode rod 3. Both anode and cathode are mounted in a cylindrical sleeve 9 which is electrically non-conductive. In the embodiment illustrated, the cathode rod tapers conically at its end essentially to a point. The anode and cathode are constructed out of conventional electrode type materials, such as copper, tungsten, etc. The cathode often has a thoriated tungsten tip or inserts which assist in cooling of the cathode.

As is conventional with plasma heaters, the anode is surrounded by an annular cooling chamber 13 through which coolant, e.g., water, or other cooling medium is circulated by means (not shown) in order to hold the anode at a suitably low temperature and prevent undue erosion thereof. In a similar manner, the interior of the cathode is provided with cooling chamber 7 and with means (not shown) to circulate water or other suitable cooling fluid therein in order to hold the cathode at a suitable operating temperature. Tube 2 serves to help support and align cathode rod 3 and provide a conduit for coolant flow. Cathode 3 can be provided with means for moving it in a vertical direction so that the distance between cathode 3 and anode 11 can be varied.

The anode and cathode are axially aligned but spaced longitudially to provide annular space 21 which tapers conically to a coaxial outlet conduit 23. The assemblage is also provided with plasma or work gas inlet means 15 having conduit 17 which communicates through annular conical conduit 19 with the annular space 21. The cathode and anode are connected by electrical connecting means (not shown) to a power supply (not shown). Typically, the power source is a direct current power source.

Reactant mixer means 30 is adjacent to the anode end of cylindrical sleeve 9, and as shown, comprises two coaxial, longitudinally spaced annular conduits 42 and 47 that are provided with inlet nozzle means 40 and 45, respectively. As shown, exit port 48 of annular conduit 47 is retracted from exit port 43 of annular conduit 42 to form a conical reactant introduction zone 24. Reactants from reactant supply means (not shown) are introduced into conduits 42 and 47 through nozzle means 40 and 45 respectively. The flow path of the reactants discharged through exit ports 43 and 48 can be perpendicular to the exiting gas from conduit 23, as shown. If desired, exit ports 43 and 48 also can be positioned away from the perpendicular, i.e., downwardly or upwardly, at an angle of from 1° to 45° from the horizontal position shown so that the reactant gas flow is directed at such angle into or in contact with the stream of hot gas emanating from the plasma heater. The reactant gas can be projected radially, tangentially or at any suitable angle therebetween into the downwardly flowing stream of heated plasma gas emanating from outlet conduit 23.

The top of reactant mixer means 30 contains opening 31 which is coaxially aligned with outlet conduit 23 of anode 11 to provide an overal direct straight-line path for the heated plasma gas from plasma generator 1 through reactant mixer means 30 into reactor 34. Preferably, the heated plasma gas is introduced into the center of reactor 34 and spaced from the walls thereof to thereby assist in positioning the reaction zone away from the walls of the reactor.

Typically, hydrogen is used as the gas which is heated by the aforementioned heating means, e.g., plasma heater 1; however, other gases, e.g., the noble gases can be used. Argon and helium are suitable plasma gases. The use of hydrogen as the plasma gas is advantageous since it insures the establishment of a reducing atmosphere and provides a halogen, e.g., chlorine acceptor, thereby removing halogen released from the metal halide, boron halide and/or halocarbon compound reactants as hydrogen halide. Mixtures of hydrogen with other gases, such as the noble gases, e.g., argon or helium, can also be employed as the plasma gas. When a noble gas is used as the plasma gas, the hydrogen required for the vapor phase reaction is introduced into the reactor by mixing it with the reactants, as a part of the boron source reactant, e.g., the boranes, and/or as a separate stream through mixer means 30.

As the heated plasma gas stream moves past the zone of reactant introduction 24, it mixes with the reactants introduced through reactant mixer means 30. The reactants are introduced usually at below reaction temperatures. Because of the high heat content of the hot hydrogen stream, no special efforts to heat the reactants to temperatures above which they are gaseous are required. The resulting gaseous mixture is forwarded into the interior of reactor 34 and reacted therein. Reactor 34 is typically externally water cooled (not shown). Typically, the reactants and reaction mixture are in turbulent flow although laminar flow can be used. The reaction mixture flowing into reactor 34 which is a recirculating-type reactor as opposed to a plug flow-type reactor, typically has an apparent residence time therein of between about 0.05 and about 0.5 seconds, more usually between about 0.1 and 0.2 seconds. The apparent residence time can be calculated by dividing the reactor volume by the gas flow through the reactor.

As shown in the FIGURE, finely-divided metal diboride powder product, which is suspended in reaction product gases as well as excess reactant gas, hereinafter collectively referred to as product gases or other equivalent terms, is removed from reactor 34 through conduit 36 and introduced into cyclones 38 and 39, in order to separate the solid metal diboride powder from the product gases. The particles of metal diboride are formed completely in the reactor and since the reactor effluent is cooled to below metal boride forming temperatures substantially immediately, substantially no metal boride formation or individual particle growth (other than by physical aggregation) occurs outside the reactor. Cyclones 38 and 39 are normally cooled, e.g., externally water cooled, to cool the powder product. For example, the cyclones can be traced with tubing through which coolant, e.g., water, is passed. As shown, the discharge from conduit 36 is introduced tangentially into cyclone 38 and from there into cyclone 39 by means of conduit 51. Metal diboride powder drops out into receivers 25 and 26, respectively, while gaseous effluent leaves cyclone 39 through conduit 52 and into solids separation chamber 28 in which there is disposed a bag filter 29, electrostatic precipitator or other convenient means for separating suspended solids from a gas. Cyclones 38 and 39, and receivers 25 and 26 are closed to the atmosphere to prevent contamination of the product with oxygen. Thus, the metal diboride powder that is formed in the reactor at metal diboride forming temperatures is removed immediately from the reactor and forwarded to product collectors that are substantially below temperatures found in the reactor. The powder product is typically cooled or allowed to cool to room temperature. However, if the cooling capacity of the cyclones and receivers is not sufficient to provide a powder product at room temperature, the product in the receivers may be above room temperature, i.e., from about 20° C. to 100° C., because of the residual heat content of the powder. Higher temperatures in the receiver may be used intentionally to promote degasification of the powder product. Separation chamber 28 as shown also has an exit or exhaust 50 on the opposite side of the bag filter. As shown, the bag filter has engaged therewith a suitable shaking means 59 to clear the filter of metal diboride powder. While only two cyclones and receivers are shown, more than two can be used. Alternatively, a single receiver and cyclone can be used.

Solids separation chamber 28 can also be a caustic water scrubber, often containing packing of some sort, e.g., balls, saddles, etc. for greater contact. The scrubber separates the fine solids from the gas stream and neutralizes acidic species therein before the gas is discharged to the atmosphere or to a flue. To recover unreacted reactants, hydrogen, hydrogen chloride, etc. from the product gases substantially devoid of its solids burden, conventional separation and recovery means for such materials can be installed between exit conduit 52 and the flue. Further, if the heat removal from the product recovery apparatus, i.e., the cyclones and receivers, is insufficient, the product transfer line 36 can be externally cooled. Moreover, a cold or cooler compatible gas can be mixed with the exiting product effluent to thereby cool it.

The metal halide and boron source reactants are mixed commonly with a carrier gas to facilitate their introduction into reactant introduction zone 24. The carrier gas can be hydrogen, recycle hydrogen, recycle solids-free product gas, or a chemically inert gas such as the noble gases, e.g., argon and helium. Hydrogen is not used with the boron source reactant, e.g., boron trichloride, for the reason that hydrogen has been observed to react with the boron halide reactant within the reactant inlet conduits thereby causing blockage thereof. Thus, when the boron source reactant is a boron halide, the inert carrier gas should be substantially free of elemental hydrogen. The carrier gas assists in cooling the mixer means, in keeping reactant conduits free of condensibles and has some effect in controlling the mixing of the reactants in zone 24 with a consequent effect on the surface area of the metal boride powder product.

In carrying out the preparation of refractory metal diboride powder, e.g., titanium diboride, by the process and with apparatus such as described in the FIGURE, a hydrogen-containing gas, e.g., hydrogen, is introduced into plasma generator means 1, through conduit 17 from whence it is directed by means of annular conduit 19, into space 21, between cathode 3 and anode 11. The hydrogen plasma gas can be introduced in a manner such that the gas flows in a spiral or helical fashion through outlet conduit 23. Alternatively, the hydrogen plasma gas can be introduced radially into the space 21 between the cathode and anode so that there is no helical flow pattern established by the plasma gas and the heated plasma gas exits the plasma heater in a substantially linear flow path.

An electric arc is established between the anode and cathode and as the arc passes through the hydrogen plasma gas, the gas is heated to high temperatures, usually temperatures above reaction zone temperatures. A hydrogen plasma gas can have an enthalpy of between 20,000 and 60,000 BTU per pound of gas, more commonly between 30,000 and 40,000 BTU/pound. The heated hydrogen plasma gas is projected directly into reactor 34, past reactant introduction zone 24 formed by the lower lip of anode 11 and the exit ports of reactant inlet conduits 42 and 47.

Reactant gases, titanium tetrachloride and boron trichloride, are introduced into nozzles 40 and 45, respectively, and thence into reactant introduction zone 24 and into the environment of the downwardly flowing stream of hot hydrogen plasma gas housed therein. Anhydrous hydrogen chloride gas is also introduced into nozzle 40 to prevent titanium diboride deposit growth on the exposed portions of reactant mixer 30. Hydrogen can be used as a carrier gas to facilitate the introduction of the titanium tetrachloride and hydrogen chloride into reactant introduction zone 24. Argon is introduced into nozzle 45 as a carrier gas to facilitate the introduction of boron trichloride into zone 24. The reactant gases can be introduced at a mass velocity such that they are aspirated by the movement of the projected plasma stream or, they can be introduced into the plasma stream at a mass velocity such that the plasma stream is momentarily constricted. Thus a principal reactant mixing zone is established in zone 24 in which the titanium tetrachloride and hydrogen chloride are introduced therein upstream of the boron trichloride. The reactant mixture is brought to reaction temperature immediately by contact with the hot hydrogen plasma gas. The reactants are thus heated from essentially their vaporization temperatures to titanium diboride forming temperatures. The reaction mixture is forwarded from the reactant introduction zone 24 into reactor 34 and into the principal reaction zone which is believed to be in the upper portion of the center of reactor 34. While a reactant mixer 30 with two slots is shown, mixer means with three, four, five or more slots can be used. A mixer with multiple slots permits each reactant or auxiliary gas to be introduced separately through its own conduit.

The formation of submicron titanium diboride powder in the substantial absence of oxygen (combined or elemental) commences essentially immediately with the mixing of the reactants at metal boride forming temperatures. Optimally, the gas phase reaction is confined to a zone within reactor 34 away from the hot surfaces of the reactant mixer means and the reactor. This minimizes deposition of the metal boride powder product on the wall surfaces, which, if not otherwise removed, will continue to build-up until causing interruption of the process. The powder that builds up on the walls of the reactor tends to be coarser than the powdery product removed from the reactor soon after it is formed. Comingling the build-up powder on the wall with the principal diboride powder product contributes to the production of a non-uniform product. When the principal powder product becomes non-uniform because of coarse powder from the reactor wall, the powder product should be classified to remove oversized particles before being used.

Finely-divided titanium diboride powder suspended in reactor effluent product gas is removed immediately from reactor 34 and introduced into cyclone 38. A portion of the powder product is removed in cyclone 38 and recovered in receiver 25. Powder product retained in the gas effluent from cyclone 38 is forwarded via conduit 51 to cyclone 39 wherein further amounts of metal diboride powder product are removed and recovered in receiver 26. Additional cyclones and receivers can be used, if needed. In most cases, the product from receivers 25 and 26 are blended into a single product.

The reactor effluent product gas, now substantially free of its solid titanium diboride powder content, is forwarded to gas separation chamber 28 where it is treated to free it from any remaining suspended titanium diboride powder. As shown in the Figure, the product gas passes through a bag filter 29 and is removed from chamber 28 by means of conduit 50. The product gas now removed of its metal diboride and/or other solids burden can be treated further to recover valuable by-products and remove noxious components therefrom before being burned or discharged to the atmosphere. If desired, the product gas can be treated to recover hydrogen and/or hydrogen halide, e.g., hydrogen chloride, for use in the present process or in some other process.

The present process is more particularly described in the following examples which are intended as illustrative only since numerous modifications and variations therein will be apparent to those skilled in the art. In the following examples, some volumes of gas are expressed in cubic feet per hour at standard conditions [14.7 pounds per square inch (101.3 kPa) pressure and 70° F. (21° C.)] or SCFH. Reactant and other gas stream rates were measured at nominal laboratory conditions, i.e., 1 atmosphere and 70° F. (21° C.), and are reported as measured if other than SCFH. Unless otherwise specified all percentages are by weight.

The following examples illustrate the preparation of refractory metal borides by vapor phase reaction of the corresponding metal halide and a boron source in the presence of a hot hydrogen stream and in the substantial absence of oxygen, combined or elemental.

EXAMPLE

Run A

Apparatus similar to that shown in the FIGURE was used to prepare titanium diboride. The arc heater was a medium voltage, medium amperage heater having a power input of 28 kilowatts. The arc heater was operated at between 24–28 kilowatts. Hydrogen in the amount of 300 SCFH was introduced into the arc heater as the plasma gas. Gaseous titanium tetrachloride in the amount of 18.7 grams per minute, together with hydrogen as the carrier gas in the amount of 20 SCFH, was introduced through the top slot of the reactant inlet assembly means. Gaseous boron trichloride, in the amount of 26.9 grams per minute with an argon carrier gas in the amount of 22 SCFH was introduced through the bottom slot of the assembly means. The run continued for 95½ minutes and titanium diboride having a B.E.T. surface area of about 14 square meters per gram was obtained. Titanium diboride deposits on the bottom lip of the reactant inlet assembly were observed at the end of the run.

Run B

The procedure of Run A was repeated except that boron trichloride was introduced through the top slot and titanium tetrachloride through the bottom slot of the reactant inlet assembly means. 25.6 grams per minute of gaseous boron trichloride with 22 SCFH argon and 18.7 grams per minute of titanium tetrachloride together with 12 SCFH of hydrogen chloride were utilized as the reactants. The run was continued for 120 minutes to produce titanium diboride, having a B.E.T. surface area of about 9.1 square meters per gram. A thin skin of titanium diboride powder deposits on the inlet assembly were observed at the end of the run. Most of the deposit was found to be attached to the bottom exposed portion of the inlet assembly, e.g., lip 46 of mixer means 30 in the FIGURE, and the exposed top lip of reactor 34.

Run C

The procedure of Run A was repeated, except that 12 SCFH of hydrogen chloride was utilized as the carrier gas for the titanium tetrachloride instead of the 20 SCFH of hydrogen and 27.8 grams per minute of boron trichloride was fed to the reactor. This run continued for 150 minutes and the titanium diboride product was found to have a B.E.T. surface area of about 5.8 square meters per gram. No growth of titanium diboride deposits on the inlet assembly means was observed.

Run D

The procedure of Run C was repeated, except that the titanium tetrachloride feed rate averaged about 21 grams per minute and the boron trichloride feed rate averaged about 29.8 grams per minute. This run continued for 975 minutes and the titanium diboride product had a B.E.T. surface area of about 6.3 square meters per gram. No growth of titanium diboride deposits on the reactant inlet assembly means was observed at the end of the run.

Run E

Run D was repeated except that 23 SCFH of hydrogen was added to the titanium tetrachloride reactant introduced through the top slot of the reactant inlet assembly means. The titanium tetrachloride and hydrogen chloride reactant addition rates averaged 19.2 grams per minute and 2.5 SCFH, respectively. Boron trichloride in the amount of 27.0 grams per minute together with 22 SCFH argon was introduced through the bottom slot of the reactant inlet assembly means. This run continued for 1,072 minutes and produced titanium diboride having a B.E.T. surface area of about 14.1 square meters per gram.

The data of the runs comprising the example show that continuity of production without objectional titanium diboride deposits can be achieved by (1) introducing anhydrous hydrogen halide, e.g., hydrogen chloride into the reaction zone upstream of the boron source reactant, e.g., boron trichloride, (2) introducing metal halide upstream of the boron source reactant, and (3) utilizing an inert carrier gas, e.g., argon for the boron source reactant.

Although the present process has been described with reference to specific details of certain embodiments thereof, it is not intended that such details should be regarded as limitations upon the scope of the invention except as and to the extent that they are included in the accompanying claims.

I claim:

1. In the process for preparing refractory metal boride powder selected from the borides of the metals titanium, zirconium and hafnium by gas phase reaction of the corresponding metal halide reactant and boron source reactant selected from the group consisting of boron halide and boron hydride in the presence of hydrogen in a reactor wherein said reactants are introduced into a reactant mixing zone through reactant inlet assembly means and reacted within the reactor to form solid refractory metal boride powder and wherein the metal boride powder tends to deposit and accumulate on the surfaces of the assembly means exposed to said reactants, the improvement which comprises establishing a hydrogen-containing gas stream in close proximity to but spaced from the exposed surfaces of the reactant inlet assembly means, introducing boron source reactant mixed with inert carrier gas into said hydrogen-containing gas stream, introducing metal halide reactant and substantially anhydrous hydrogen halide into said hydrogen-containing gas stream upstream of the boron source reactant, the amount of hydrogen halide introduced being sufficient to retard growth of said metal boride powder on said exposed surfaces of the assembly means, the heat content of the hydrogen-containing gas stream and reactants being sufficient to establish refractory metal boride forming temperatures in said reactor.

2. The process of claim 1 wherein the anhydrous hydrogen halide is introduced mixed with the metal halide reactant.

3. The process of claim 1 wherein the inert carrier gas mixed with the boron source reactant is a noble gas.

4. The process of claim 1 wherein the amount of anhydrous hydrogen halide used is between about 50 and about 350 mole percent hydrogen halide based on the metal halide reactant.

5. The process of claim 1 wherein the halide portion of said hydrogen halide corresponds to the halide portion of the metal halide reactant.

6. The process of claim 1 wherein the metal halide reactant is titanium tetrachloride, the boron source reactant is boron trichloride and the carrier gas for the boron trichloride is argon.

7. The process of claim 6 wherein a hydrogen carrier gas is used with the titanium tetrahalide reactant.

8. The process of claim 1 wherein the hydrogen-containing stream is produced by heating hydrogen in plasma heating means.

9. In the process for preparing submicron finely-divided titanium diboride by gas phase reaction of titanium halide and boron source reactants in the presence of hydrogen in a reactor wherein the reactants are introduced through reactant inlet assembly means into a reactant mixing zone housing a hot hydrogen gas stream and reacted within the reactor to form solid titanium diboride product and wherein the titanium diboride product tends to deposit and accumulate on the surfaces of the assembly means exposed to said reactants, the improvement which comprises the steps of introducing a hot hydrogen gas stream into the reactant mixing zone, introducing titanium tetrahalide reactant and substantially anhydrous hydrogen halide into said hydrogen stream upstream of the boron source reactant, the amount of hydrogen halide being between 50 and 350 mole percent hydrogen halide based on the metal halide reactant, introducing boron source reactant mixed with inert carrier gas into said hydrogen stream, the heat content of the hydrogen stream and the reactants being sufficient to establish titanium diboride forming temperatures in said reactor, and removing solid titanium diboride from the reactor.

10. The process of claim 9 wherein the titanium tetrahalide is titanium tetrachloride, and the boron source reactant is boron trichloride.

11. The process of claim 10 wherein the inert carrier gas is argon.

12. The process of claim 10 wherein the hydrogen-containing stream is produced by heating hydrogen in plasma heating means.

13. The process of claim 12 wherein the plasma heating means is an arc plasma heater.

14. The process of claim 10 wherein the hydrogen halide is hydrogen chloride.

15. The process of claim 10 wherein a hydrogen carrier gas is used with the titanium tetrachloride reactant.

16. The process of claim 12 wherein the inert carrier gas is argon and the hydrogen halide is hydrogen chloride.

17. The process of claim 16 wherein a hydrogen carrier gas is used with the titanium tetrachloride reactant.

* * * * *